(12) United States Patent
Everingham et al.

(10) Patent No.: US 8,126,133 B1
(45) Date of Patent: Feb. 28, 2012

(54) RESULTS-BASED ROUTING OF ELECTRONIC COMMUNICATIONS

(75) Inventors: James Everingham, Aptos, CA (US); Lloyd William Tabb, Santa Cruz, CA (US); Terry Weissman, Los Altos, CA (US); Will Scullin, Oakland, CA (US)

(73) Assignee: LiveOps, Inc., Santa Clara, CA (US)

( * ) Notice: Subject to any disclaimer, the term of this patent is extended or adjusted under 35 U.S.C. 154(b) by 1667 days.

(21) Appl. No.: 10/817,350

(22) Filed: Apr. 1, 2004

(51) Int. Cl.
*H04M 3/00* (2006.01)

(52) U.S. Cl. ......... 379/265.01; 379/265.05; 379/265.06; 379/265.11; 379/266.07

(58) Field of Classification Search ............. 379/266.07, 379/266.08, 265.01, 265.05, 265.06, 265.11
See application file for complete search history.

(56) References Cited

U.S. PATENT DOCUMENTS

| | | | | |
|---|---|---|---|---|
| 5,299,260 A * | 3/1994 | Shaio | ........................ | 379/266.07 |
| 5,592,543 A * | 1/1997 | Smith et al. | .............. | 379/266.07 |
| 5,903,641 A * | 5/1999 | Tonisson | ................... | 379/265.12 |
| 6,173,053 B1* | 1/2001 | Bogart et al. | ............ | 379/266.01 |
| 6,327,611 B1 | 12/2001 | Everingham | | |
| 6,535,601 B1* | 3/2003 | Flockhart et al. | ........ | 379/266.01 |
| 6,553,114 B1* | 4/2003 | Fisher et al. | ............. | 379/265.12 |
| 6,639,982 B1* | 10/2003 | Stuart et al. | .............. | 379/266.03 |
| 6,766,012 B1* | 7/2004 | Crossley | .................. | 379/265.02 |
| 6,832,203 B1* | 12/2004 | Villena et al. | ..................... | 705/8 |
| 7,062,031 B2 | 6/2006 | Becerra et al. | | |
| 7,158,628 B2 | 1/2007 | McConnell et al. | | |
| 2001/0024497 A1* | 9/2001 | Campbell et al. | ........ | 379/265.09 |
| 2002/0054587 A1* | 5/2002 | Baker et al. | .................... | 370/352 |
| 2005/0043986 A1* | 2/2005 | McConnell et al. | ............ | 705/11 |
| 2005/0135601 A1* | 6/2005 | Whitman, Jr. | ........... | 379/266.08 |

OTHER PUBLICATIONS

Stiil Leaving It to Fate?: Optimizing Workforce Management, Durr, William Jr., Nov. 2001, p. 1-5.*
U.S. Appl. No. 11/346,667, Ginda et al.
Office Action for U.S. Appl. No 10/886,333, Everingham et al., mailed Oct. 15, 2007.
Notice of Allowance for U.S. Appl. No. 10/866,333, Everingham et al., Jun. 5, 2008.

* cited by examiner

*Primary Examiner* — Ahmad Matar
*Assistant Examiner* — Khai N Nguyen
(74) *Attorney, Agent, or Firm* — Patentesque Law Group, LLP

(57) ABSTRACT

A method for performing results-based routing of telephone calls. Agents handle telephone calls seeking or inquiring into a product or service. Agents are distributed among agent pools, with each pool being defined by one or more criteria, on a real-time and/or batch basis. Such criteria may reflect an agent characteristic (e.g., age, geographical location, language, hobby, skill), a level of agent performance (e.g., number or amount of sales, speed or efficiency in providing a service) or some other factor. When a call is received at a call manager, a pool of best agents or some other pool is selected (e.g., by weighting, by statistical distribution). The best available agent in that pool is identified and the call is routed to that agent. The call manager, or other entity, may record some or all of the call (e.g., voice conversation, the agent's computer input during the call).

34 Claims, 3 Drawing Sheets

RESULTS-BASED ROUTING OF ELECTRONIC COMMUNICATIONS

BACKGROUND

This invention relates to the fields of computer systems and communications. More particularly, a system and methods are provided for automatically routing telephone calls or other electronic communications based on results of previous and/or concurrent routing.

In the servicing of telephone calls from people seeking a product (i.e., to buy) or a service (e.g., customer service), all calls directed to a particular telephone number are generally routed to one group or pool of agents. For the purpose of call routing, each agent is considered equally capable of servicing any call routed to that group. Therefore, calls may be routed in round-robin fashion (i.e., to the agent next in sequence), to the agent who has been idle for the longest period of time, or in some other manner designed to provide an even distribution of calls among the agents.

However, it is often the case that not all agents are equally qualified, skilled or capable of handling any call. For example, one agent may be particularly skilled at handling calls for customer assistance but is not very effective at selling a product, while another agent provides poor directory assistance but is very successful at selling a product. Even among calls of a particular type, such as for selling a product, one agent may be better qualified or more successful at selling electronics than home furnishings, while another sells more home furnishings than electronics and yet another is more effective at closing sales during calls matching other criteria.

Despite the manner in which call routing is usually handled, it is generally desirable to route calls in a manner that will promote the most success. Successful calls may be defined as calls that result in a product being sold or the efficient and accurate provision of some service (e.g., directory assistance, customer service).

Thus, there is a need for a more effective method of routing telephone calls from callers seeking or inquiring about some product or service. In particular, there is a need for a method of performing results-based routing, wherein a particular call is routed to an agent or other entity that has exhibited notable success in servicing that type of call (e.g., for a particular product or service). There is also a need for measuring agents' success and/or comparing one agent's efficiency or effectiveness against other agents, on a real-time and/or batch basis.

SUMMARY

In one embodiment of the invention, a method is provided for performing results-based routing of telephone calls. Agents handle telephone calls from callers seeking or inquiring into a product or service. Agents are distributed among agent pools, with each pool being defined by one or more criteria. Such criteria may reflect an agent characteristic (e.g., age, geographical location, language, hobby, skill), a level of agent performance (e.g., number or amount of sales, speed or efficiency in providing a service) or some other factor. An agent may be assigned to multiple pools. Pool membership and/or agent rankings may be altered on a real-time and/or non-real-time basis.

When a call is received at a call manager (e.g., a server), a pool of best agents, or some other pool, is selected (e.g., by weighting, by statistical distribution). A pool may even be created in response to receipt of a call. The best available agent in a selected pool is identified and the call is routed to that agent. Some or all of the call (e.g., voice conversation, the agent's computer input during the call) may be recorded.

In one embodiment, criteria may be tested to determine how well they correlate with successful call servicing. A pool of agents may be assembled based on the criteria, and the performance of that pool may be examined over time to determine the success of the test pool versus other pools.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In one embodiment of the invention, a method is provided for automatically routing a telephone call based on successful handling of previous calls. More particularly, characteristics of agents that successfully serviced previous calls are used to select a best-qualified agent for handling a new telephone call.

While embodiments of the invention discussed below apply to the automatic routing of telephone calls seeking or inquiring about a product or service, other embodiments of the invention may be derived from the following discussions. For example, another embodiment of the invention may be applied for other types of electronic communications (e.g., electronic mail, interactive network communications), regarding a product or a service that requires little or no oral interaction between the sender of the communication and the agent or other entity that provides the product or service (e.g., translation or transcription of a recording, conversion of a set of electronic data, streaming of a media file).

Figure 1:
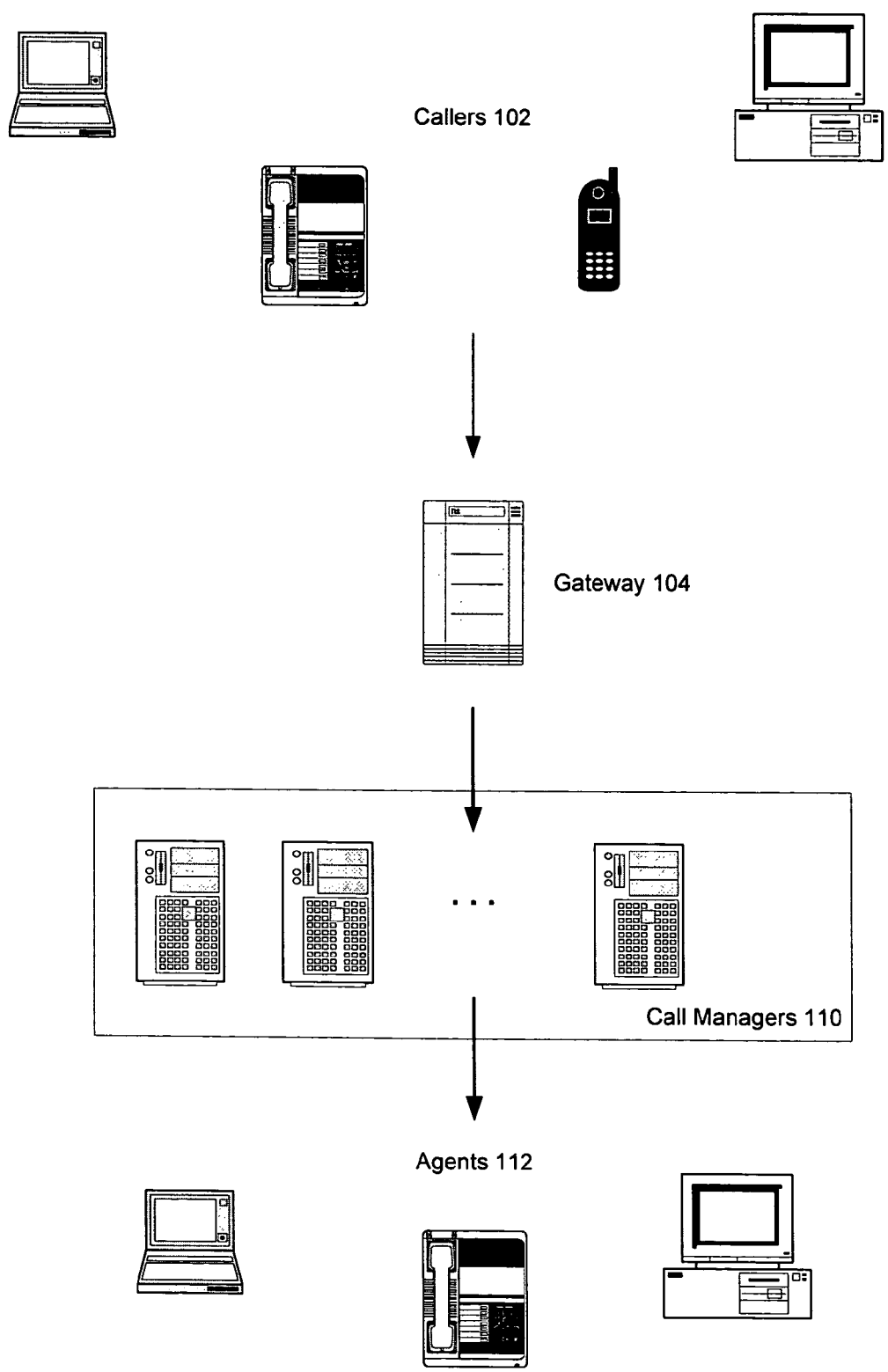
FIG. 1 is a block diagram depicting a call routing system in accordance with an embodiment of the present invention.

FIG. 1 depicts a simplified call routing system for facilitating a method of automatic, results-based routing, according to one embodiment of the invention. In this embodiment, telephone or media gateway 104 receives calls from callers 102 through wired and/or wireless connections, via standard POTS, VoIP (Voice over Internet Protocol) or other systems. At gateway 104, an incoming call is signaled to call manager 110. Any number of gateways and call managers may be employed in a call routing system.

Each call manager 110 comprises a computing device configured to manage inbound call legs (i.e., from callers) and outbound call legs (i.e., to agents). As described below, a call manager may automatically generate (in real-time) or select a pool of agents considered qualified to handle the call. For example, agents in the selected pool may share a characteristic that is likely to promote successful handling of the call, wherein success may be defined as the sale of a product, the satisfaction of a service request, etc.

The call manager then automatically identifies a best-qualified agent from the available agents in the selected pool (e.g., agents not already handling a call). As discussed below, various criteria or factors may be considered to determine the best-qualified agent (e.g., previous sales success, previous sales amount, service efficiency). If no agents are available in the selected pool, another pool may be chosen, such as one defined by characteristics similar to the selected pool. Thus, there may be a hierarchy of pools for a given call or type of call, with each pool considered in turn if the ones before it are empty.

When the best-qualified agent is selected, the call manager automatically establishes the outbound call leg to the agent and connects it to the inbound call leg from the caller. The call manager may monitor or record, or facilitate the monitoring or recording, of any portion of the call.

In a present embodiment of the invention, agents are assigned to agent pools based on various characteristics. Characteristics used to select a set of agents or define a pool are not limited, and may include: language or dialect, accent, geographical region or location, age, sex, marital status, family size, ethnicity, hobbies (e.g., coin collecting), skills (e.g., ability to play a particular musical instrument), sports played, whether the agent has children, historical success rates, etc. An agent may be assigned to multiple pools.

A pool may also be defined by criteria used to identify successful servicing of a call by an agent. For example, when a telephone campaign is established to sell a product, success may be measured by the number (or percentage) of orders taken by an agent, the number of products sold, a dollar amount of sales, a ratio of calls that resulted in sales to the total number of calls serviced, a conversion rate, etc. For example, a dynamic pool may be defined to include agents having a conversion (e.g., sales) rate greater than 65%. As agents' conversion rates fluctuate, they may flow into and out of this pool.

When assembling a pool of agents for a new campaign for which historical success rates are unavailable, a success rate for an agent may be predicted based on success in a similar or comparable campaign.

For agents providing customer service, directory assistance or some other service, success may be associated with criteria such as the average length of the telephone calls that were serviced, a ratio of the amount of time spent providing the service to the agent's total time, the number or percentage of calls that were successfully serviced, the accuracy of information provided by the agent, etc. Agents' performance may be used to generate rankings—within a pool and/or across pools. An agent may be dynamically added to or removed from a pool (e.g., as his or her characteristics or rankings change).

In one embodiment of the invention, a telephone program is established in relation to a new product or service to be offered by agents. The agents may work at their homes, at a temporary office, at one or more central locations, etc.

Each program may have any number of campaigns, representing different product/service versions or options. For example, different campaigns of a program may be established for different pricing options, different product qualities or designs, different languages, etc. Each campaign may have any number of telephone numbers associated with it. Each campaign, and possibly each telephone number within a campaign, may be associated with a set of pools of agents.

Thus, if it is believed or known (e.g., from historical data) that agents having certain characteristics are more likely to successfully handle a call within a particular campaign, agent pools associated with those characteristics may be assigned to that campaign or telephone number. Success may be defined in this case to mean selling or providing the associated product or service. Any number of pools may be assigned to a campaign or telephone number.

For example, if a first campaign of a program is for a relatively expensive version of a product, a pool of agents that have been successful in the past at selling relatively highly priced products may be assigned to the campaign. A second campaign may be presented in a different language from the first campaign, and thus a pool of agents who speak that language may be assigned to the second campaign.

As calls are handled by the agents, various data are collected. Such data may include: length of call, outcome of call (e.g., whether a product was sold), a conversation between the caller and agent, computer input made by the agent during the call, etc. The data may be used to generate several measures of success, such as conversion rate (i.e., the number of orders taken by an agent divided by the total number of calls handled by the agent), gross revenue (i.e., conversion rate multiplied by the agent's average order value), order rate (i.e., the amount of time the agent spends taking orders, divided by the agent's total time handling calls), order rate ranking (i.e., order rate multiplied by the agent's average order value), etc.

These data may be used not only to rate or rank agents according to their success in handling calls, but may also be used to identify characteristics shared by agents that are relatively successful. For example, after a group of successful agents is identified (e.g., by order rate ranking), characteristics common to those agents may be determined. For example, it may be learned that agents having a particular personal hobby (e.g., playing the guitar) seem to be more successful at selling a particular product (e.g., a guitar) than other agents. A pool of agents having that hobby may then be established for the campaign.

Other factors may also be considered when ranking agents. For example, agents may be ranked and/or placed into pools based on whether they have attended formal agent training, the dates/times of telephone calls handled by the agents, the agents' ages or other characteristics, and so on.

In one embodiment of the invention for a campaign to sell a product, multiple time frames may be of interest. An agent's handling of a call within a particular time frame may be compared to other agents' handling of calls within the same time frame to help determine the agent's ranking.

Illustratively, a first time frame may cover a period during which a media event advertising the product, such as a television commercial, is broadcast. A second time frame may comprise a time period before and/or after the media event (e.g., some or all of a television show during which the media event is broadcast).

The third time frame may cover a time period further removed from the media event (e.g., hours or days earlier or later). In addition, calls during the third time frame may change in character over time. In particular, early in the campaign, most calls during the third time frame may be from callers interested in buying the product. Later in the campaign, a significant portion of calls in the third time frame may be for customer service. As mentioned above, an agent's handling of a call received in a particular time frame or period may be compared against other agents' successes in the same time frame or period.

In one embodiment of the invention, an agent characteristic or other factor may be tested to determine whether or how well it correlates with successful call handling. If it is thought, for example, that agents that have children may be more likely to be successful at selling a home security system or other security product, a test pool of agents may be defined to include only agents having children. Such a pool may be assembled in real-time (e.g., on a per-phone call basis). The performance of that pool of agents is then monitored over time to determine how the number or ratio of orders taken by that pool of agents compares to other pools.

Agent characteristics may be determined by querying them when they are online with the call routing system, by having them complete a survey or questionnaire, or by other means. Thus, an agent may be added to a pool based on his or her assertions or answers to queries. A false assertion or answer by the agent may later be automatically suspected or detected if, for example, a pool that includes the agent is found to correlate well with successful call servicing, except for that agent.

To facilitate ranking of new agents, they may be assigned a proportion of received calls, on a round-robin schedule or other scheme for fairly distributing calls among them. In normal operation, most calls may be routed to the most-qualified (i.e., highest ranked) agents in a pool. A lower or bottom portion of agents in the pool may be grouped with new agents, and some number or percentage of calls may be distributed among them. This scheme helps ensure that a new agent is able to move up in the agent rankings and earn a chance to receive more calls.

Figure 2:
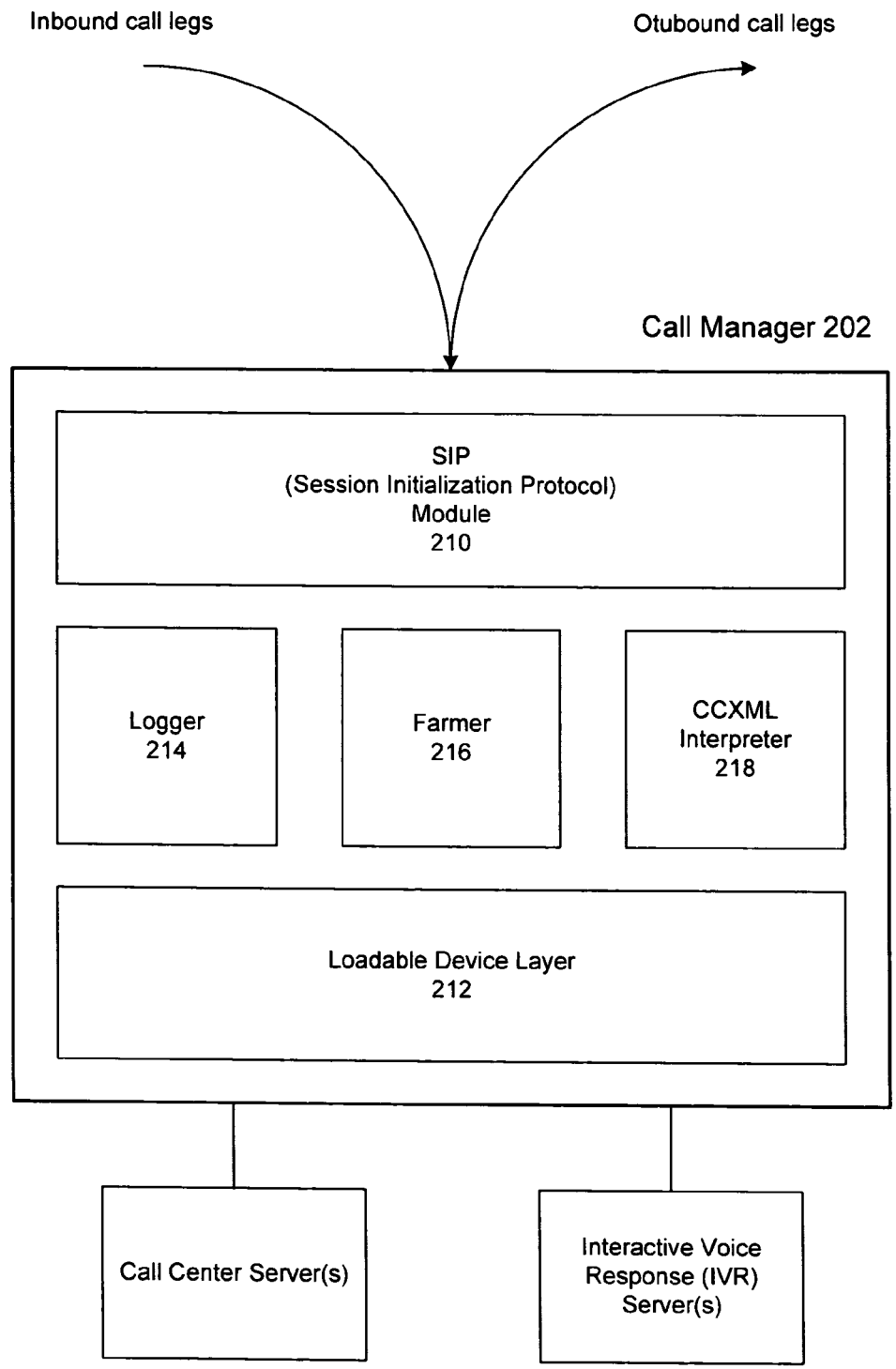
FIG. 2 is a block diagram of a call manager server for automatically routing telephone calls, in accordance with an embodiment of the invention.

FIG. 2 is a block diagram of a call manager for automatically routing or managing a telephone call, according to one embodiment of the invention. Call manager server 202 may be the only call manager deployed in a system for servicing telephone calls, or may be one of a set of call managers. A load balancer or similar entity may be employed to balance the distribution of calls among active call managers.

Call manager 202 of FIG. 2 includes SIP (Session Initialization Protocol) module 210, loadable device layer (LDL) 212, logger 214, farmer 216, CCXML interpreter 218, any number of SLICs (Subscriber Line Interface Cards), one or more processors, one or more storage devices, and/or other components helpful for making, receiving and managing call legs.

In an embodiment of the invention, an inbound call leg is received or signaled at SIP module 210, using SIP signaling, from a telephone or media gateway. In other embodiments of the invention, other signaling schemes may be used, such as Signaling System 7 (SS7), Media Gateway Control Protocol (MGCP), H.323, etc. In one alternative embodiment of the invention, SIP module 210 comprises a SIP proxy, and may be physically separate from the computer system(s) or server(s) that comprise the other components of call manager 202.

The call manager may identify the destination telephone number (e.g., DNIS or Dialed Number Identification Service), originating telephone number (e.g., ANI or Automatic Number Identification) and/or other portions of the call signaling. In this embodiment of the invention, the DNIS may be used to identify the campaign (e.g., product or service) for which the call was received.

Using the DNIS or other call signaling data as a key, a database lookup may be performed to identify the associated campaign. This lookup may be performed by SIP module 210, LDL 212 or some other component of call manager 202. The database may be located on call manager 202 or some other component of a call routing system.

In response to receipt of the inbound call leg, loadable device layer 212 is queried to determine how to handle the call. Thus, in this embodiment the LDL is responsible for determining which pool(s) of agents can or should handle the call. For example, the LDL may query a database or other storage structure that maps campaign telephone numbers to agent pools. Based on the campaign, any number of agent pools may be identified.

In other embodiments of the invention, the LDL may load and execute other applications, applets, plug-ins, scripts or other programming. For example, if call manager 202 is configured to provide callers with access to long distance dialing, a different applet (i.e., for making long distance calls) may be executed for a received call having a particular DNIS or for a call initiated within the call routing system.

In the embodiment of FIG. 2, the LDL may also be responsible for determining exactly which pool (of multiple pools) should receive the call and, in that pool, which is the best-qualified agent for receiving the call. Illustratively, weighting may be applied to agent pools to indicate how calls should be distributed between them. For example, the weighting may indicate that X calls go to PoolA, Y calls to PoolB and Z calls to PoolC out of every (X+Y+Z) calls received at the call manager (or the set of call servers).

Within the selected pool of agents, available agents (i.e., agents that are online but not handling other calls) may be automatically ranked by virtually any criteria. For example, measures of success described above (e.g., conversion rate, gross revenue) may be used to rank the agents.

In one embodiment of the invention, after LDL 212 identifies one or more pools of agents considered capable of handling a new call, the LDL may contact one or more call center servers, which couple individual agents to the call handling system. The LDL provides each call center with sufficient information to identify agents who are connected to the call center and who are capable of taking the call (i.e., they are in a pool selected by the LDL) and are not engaged in another call. Thus, the LDL may identify the call's campaign and/or the specific pool(s) from which an agent will be selected for the call.

Each call center server then identifies to the LDL its best available agent for the selected pool(s), and may also identify the criteria or characteristics (or values for the criteria or characteristics) that led the call center server to select that agent as the best available agent. The LDL then selects a best overall agent from the agents identified by the call center servers.

If no agents are currently available for the selected pool(s), the call center servers will send negative responses to the LDL, and the LDL will place the call into a queue. Illustratively, the call manager may connect the call to an IVR (Interactive Voice Response) server configured to maintain the queue. The IVR server may also provide call status updates to the caller, play music, take an order for a product or a request for customer service information, accept a call-back request, etc.

When an agent becomes available on a call center server, the call center server (or a call manager) may automatically check with the IVR server (or a call manager) to determine if the agent is capable of handling any calls in the queue. If so, the call is pulled from the queue and redirected to the agent.

If multiple calls are waiting to be serviced, and a limited number of agents is available (e.g., one, a few), characteristics of the agent and/or the calls may be used to determine which call to route to an available agent. For example, the age of the call in a queue may be a factor, but also the type of call (i.e., whether it is for a product or a service), the geographical area from which the call originated, etc. Also, however, agent characteristics such as age, conversion rate, geographical location, and so on may be considered. Thus, when a limited number of agents is available, an agent may be given a call that he or she is more likely to be able to handle successfully.

In one embodiment, the LDL comprises a CCXML (Call Control eXtensible Markup Language) interpreter, such as CCXML interpreter 218, and executes different scripts for different campaigns or different campaign telephone numbers. A script may identify target agent pools and/or how to identify the best-qualified agent—for example, the script may specify the characteristics or factors that should be used to rank agents, and/or may perform such ranking. In other embodiments of the invention, LDL 212 may comprise a Java interpreter or may comprise some other entity for executing virtually any type or set of executable instructions.

In an illustrative embodiment of the invention, agents are coupled to a call routing system (and call manager 202) by intermediate servers such as the call center servers mentioned above, or agent servers, chat servers, etc. Agents log into the system via the intermediate servers, and thus the call routing system may include any number of intermediate servers, which may be colocated or dispersed. Agents may log into intermediate servers based on their geographical location, the pool(s) to which they are assigned, or some other factor(s).

In the embodiment of the invention depicted in FIG. 2, LDL 212 of call manager 202 executes a call redirection applet to find or select an agent for servicing a call. As described above, the call redirection applet may be designed to query each intermediate server, to have it identify the agent logged into the intermediate server who is the best-qualified available agent to service the call. Then the applet may select a best-qualified agent from the agents identified by the intermediate servers. The intermediate servers may run the same, or similar, applet to identify their best available agents.

After a target agent is identified or selected, call manager 202 initiates an outbound call leg to the agent and bridges the two legs. At, or about the same time, the call manager notifies the intermediate server to which the selected agent is connected, to inform the server that the agent has been selected. The intermediate server may then prepare the agent (e.g., by sending a screen pop, an instant message, a chat message).

In the embodiment of the invention depicted in FIG. 2, logger 214 is configured to record some or all of the interaction between the caller and the agent servicing the caller's call. The logger may record their voice exchanges, telephone and/or keyboard keys that are pressed, etc. For example, the verbal interaction between the caller and agent may be recorded as a .WAV file (or other sound file) and then compressed to .MP3 format or some other compressed file format.

Because call manager 202 is configured to manage the call legs, it can automatically detect when a leg hangs up. At that time, logger 214 may terminate its recording. After the recording is completed, it may then be compressed and/or transferred to other storage (e.g., for archiving).

Farmer 216 is an entity, such as a software module, configured to maintain agent pools. When an agent logs into the call routing system, farmer 216 makes that agent available in his or her assigned pools. Thus, as agents connect to and disconnect from the system, farmer 216 ensures that each agent is associated with the correct pools.

When the outbound call leg hangs up, the agent who serviced that call can immediately be made available for another call. Thus, in the embodiment of FIG. 2, the call routing system and call manager are event-driven. In particular, termination of the call leg may be interpreted as an event, the consequence of which is to mark the agent as available. This can be contrasted with traditional call routing systems that must test for available agents. In a traditional system, an inquiry into each agent's status (i.e., whether he or she is handling a call) may be performed on a periodic basis. Thus, an agent may be idle for some time after finishing servicing one telephone call before his or her availability is recognized by the system.

Figure 3:
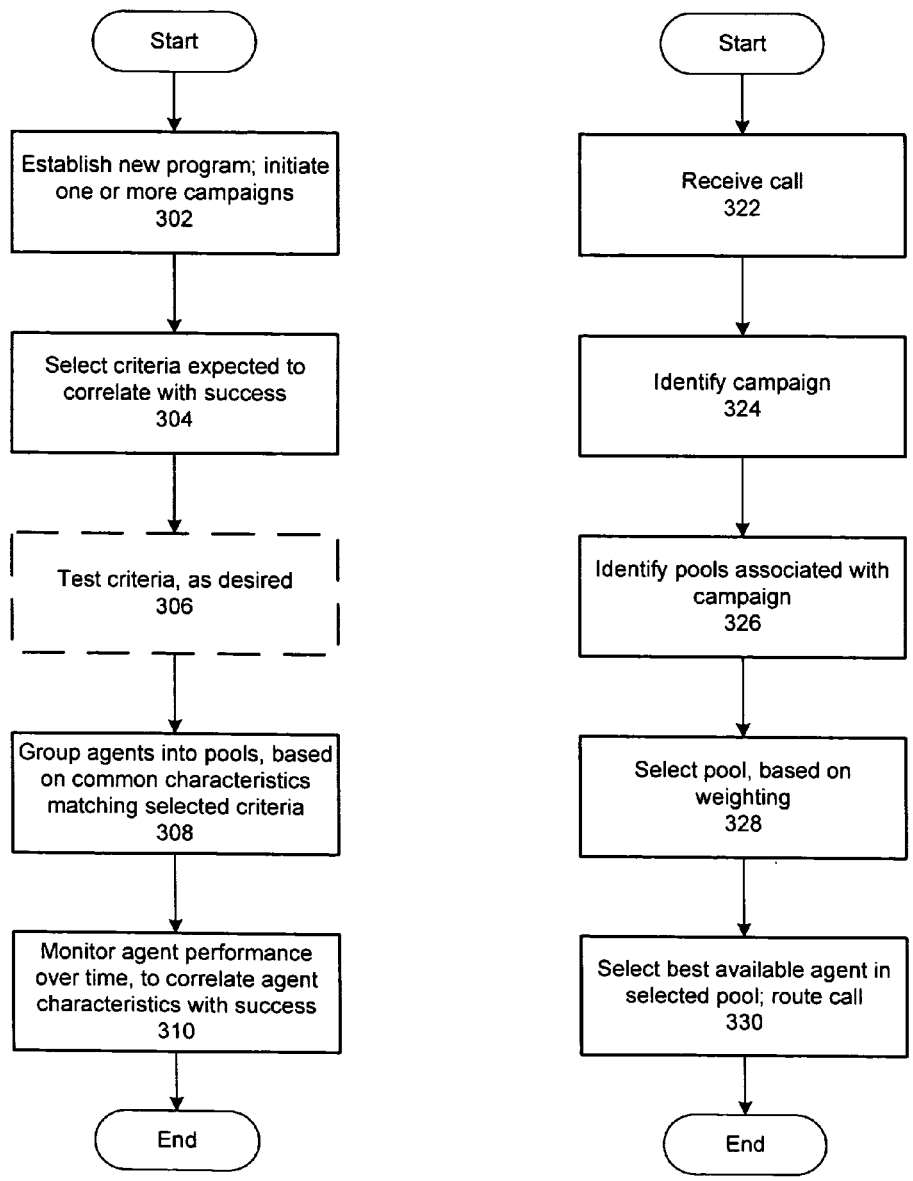
FIG. 3 is a flowchart illustrating one method of automatically routing a telephone call based on results of previous call handling, in accordance with an embodiment of the invention.

FIG. 3 demonstrates a method of performing results-based routing, according to one embodiment of the invention. Operations 302 through 310 demonstrate how agent pools may be assembled for a telephone campaign. Operations 322 through 330 demonstrate how a new call in the campaign may be automatically routed.

In operation 302, a new program offering a product or service is established, along with one or more associated campaigns for that program. Each campaign may be associated with a different version of the product or service, such as different prices, different designs or formats, different target geographical regions, different media in which the campaign is product or service is advertised, different languages, etc. One or more telephone numbers are associated with each campaign.

In operation 304, any number of criteria known or expected to correlate well with a successful campaign are identified. Depending on the type of program, a successful campaign may be defined to mean a high number of sales of a product or the efficient provision of a service. The criteria may include agents' past performance in selling a product or providing a service, a personal or demographic characteristic of an agent, or virtually any other criteria that can distinguish one agent from another.

In optional operation 306, criteria may be tested, as described above. In particular, a pool of agents may be defined based on some characteristic or factor, and then the performance of the pool may be monitored over time to see if that characteristic or factor appears to correlate with successful call servicing.

In operation 308, any number of agents is distributed among any number of pools, with each pool being defined by one or more criteria. For example, a pool of top sellers may be established, with membership in the pool limited to those agents having a conversion rate (or other measure of sales success) above a specified threshold. Another pool may be established based on efficiency in providing a service (e.g., customer service), to include agents having relatively high efficiency (e.g., a high number of calls handled in a set period of time).

Any agent may be assigned to any number of pools, and a pool may include any number of agents. Agents' pool assignments may be stored when they are not online, and may be constantly and automatically updated. For example, an agent not originally in the "top seller's" pool may be added later after his or her sales success increases. Within a pool, agents may be ordered by some measure of their past success (e.g. conversion rate, gross revenue).

Illustratively, an agent's performance may be updated in real-time, perhaps with every telephone call he or she services. When a measure of the agent's success passes any threshold required for membership in a pool, that agent may be automatically added. Similarly, if an agent's performance decreases, he or she may be dropped from a pool.

Likewise, new pools may be dynamically generated in real-time. By appropriately configuring a loadable device layer (or call redirection applet executed by the loadable device layer), a call manager can generate a new pool whenever desired, even on a per-call basis.

Also, agent characteristics may be solicited or queried in order to facilitate maintenance of agent pools. For example, if a pool is to be assembled to include agents who enjoy fishing (e.g., to test whether such a pool would be effective at selling a particular product), agents may be asked whether they enjoy this activity. Based on their responses, the pool can then be assembled.

In one alternative embodiment of the invention, agents' performance ratings and/or pool membership may be updated in batch fashion (i.e., not in real-time).

In operation 310, the performance of the pools and agents is continuously monitored and updated. In this way, it can be determined which agents and agent pools are particularly successful, which helps identify those agent characteristics and/or other criteria that appear to correlate well with successful call servicing.

In operation 322, a call to a telephone number associated with a particular campaign is received at a call manager server. The ANI of the call may be identified to determine the caller's geographical area; other call information may also be retrieved or saved.

In operation 324, the campaign associated with the destination telephone number of the call is identified. More than one telephone number may be associated with one campaign, and more than one campaign may be associated with one telephone number.

In operation 326, one or more pools associated with the campaign or telephone number are identified (e.g., by querying a database internal or external to the call server). Or, a new pool is dynamically defined for the call.

In operation 328, the call server selects a pool to route the call to. This selection may be made on the basis of weights associated with each pool. Or, pools may be ordered hierarchically (e.g., based on measures of success). As long as at least one agent in the highest pool is available, the call may be assigned to that pool. Thus, this embodiment of the invention does not attempt to ensure a fair distribution of calls among agents. Instead, it is desired to promote the most successful servicing of calls, and thus the best-qualified agents are assigned more calls than other agents.

In operation 330, the best available agent in the selected pool is identified, and the call is routed to that agent (e.g., a call leg is established between the call server and the agent). Illustratively, call center servers are instructed to identify their best available agents to the call manager server. The call manager server then identifies the best agent from those candidates. That agent's call center server is notified when the call is being routed to the agent. That call center server may then alert the agent and send the agent an automated template, product descriptions, and/or other information regarding the campaign.

In the embodiment of the invention described in conjunction with FIG. 3, human agents receive telephone calls regarding certain products or services. In other embodiments of the invention, human or automated agents may receive other types of electronic communications (e.g., electronic mail messages, interactive network connections).

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory.

What is claimed is:

1. A computer-implemented method of automatically routing a telephone call to an agent, comprising:
    identifying a campaign involving servicing of telephone calls;
    creating a plurality of pools of agents for servicing the telephone calls, wherein each said pool has one or more associated characteristics common to each agent assigned to said pool;
    ranking the agents in the plurality of pools including:
        assigning a new agent to a group of agents from the plurality of pools, said group including lower performing agents;
        reserving a specified percentage of calls to be routed to said group;
        distributing the specified percentage of calls to be routed to said group among agents in said group using an equal distribution scheme; and
        ranking the new agent based on the new agent's success in handling calls routed to the new agent;
    receiving a first telephone call directed to a destination telephone number associated with the campaign;
    identifying a first pool of ranked agents in said plurality of pools having an associated characteristic expected to correlate with successful servicing of telephone calls for the campaign;
    automatically selecting a most-qualified available ranked agent within said first identified pool; and
    automatically routing the first telephone call to the most-qualified available ranked agent.

2. The method of claim 1, wherein the campaign involves selling a product to callers making the telephone calls.

3. The method of claim 2, wherein a successfully serviced telephone call is a telephone call in which the product is sold to the caller.

4. The method of claim 1, wherein the campaign involves providing a service to callers making the telephone calls.

5. The method of claim 4, wherein a successfully serviced telephone call is a telephone call in which the service is efficiently provided to the caller.

6. The method of claim 1, wherein said creating a plurality of pools comprises:
    defining a first pool of agents associated with a first personal characteristic;
    wherein said first personal characteristic is one of: age, sex, marital status, number of children, language, ethnicity, education, geographical location, hobby and skill.

7. The method of claim 1, wherein said creating a plurality of pools comprises:
    defining a first pool of agents associated with a first performance characteristic;
    wherein said first performance characteristic indicates a performance of an agent during a successfully serviced telephone call.

8. The method of claim 1, wherein said identifying a first pool comprises:
   identifying a set of pools associated with the destination telephone number; and
   selecting said first pool based on weights assigned to each pool in the set of pools.

9. The method of claim 1, wherein said identifying a most-qualified available agent comprises:
   identifying one or more agents in said first pool who are not currently handling telephone calls; and
   from said one or more agents, selecting the agent having the highest past success.

10. The method of claim 9, wherein said past success is measured by one or more of: conversion rate, gross revenue, order rate and order rate ranking.

11. The method of claim 1, wherein said identifying a most-qualified available agent comprises:
   if insufficient historical success information is available for the campaign to enable selection of a most-qualified agent, selecting an agent most-qualified for a comparable campaign.

12. The method of claim 1, further comprising:
   dynamically updating which agents are assigned to said first pool.

13. A non-transitory computer readable medium storing instructions that, when executed by a computer, cause the computer to perform a method of automatically routing a telephone call to an agent, comprising:
   identifying a campaign involving servicing of telephone calls;
   creating a plurality of pools of agents for servicing the telephone calls, wherein each said pool has one or more associated characteristics common to each agent assigned to said pool;
   ranking the agents in the plurality of pools including:
      assigning a new agent to a group of agents from the plurality of pools, said group including lower performing agents;
      reserving a specified percentage of calls to be routed to said group;
      distributing the specified percentage of calls to be routed to said group among agents in said group using an equal distribution scheme; and
      ranking the new agent based on the new agent's success in handling calls routed to the new agent;
   receiving a first telephone call directed to a destination telephone number associated with the campaign;
   identifying a first pool of ranked agents having an associated characteristic expected to correlate with successful servicing of telephone calls for the campaign;
   automatically selecting a most-qualified available ranked agent within said first pool; and
   automatically routing the first telephone call to the most-qualified available ranked agent.

14. A computer-implemented method of routing a telephone call to an agent best qualified to handle the call, comprising:
   maintaining multiple pools of agents for servicing telephone calls, wherein each said pool is associated with one or more unique characteristics;
   ranking the agents in the plurality of pools including:
      assigning a new agent to a group of agents from the plurality of pools, said group including lower performing agents;
      reserving a specified percentage of calls to be routed to said group;
      distributing the specified percentage of calls to be routed to said group among agents in said group using an equal distribution scheme; and
      ranking the new agent based on the new agent's success in handling calls routed to the new agent;
   automatically capturing measurements of success of multiple telephone calls successfully serviced by agents in different pools;
   receiving a first telephone call at a first destination telephone number;
   automatically selecting a first pool in the multiple pools;
   automatically selecting the best available ranked agent in the selected pool, wherein the best available ranked agent is defined as an available agent more successful at handling calls than all other available ranked agents in the selected pool; and
   automatically connecting the first telephone call to the best available ranked agent.

15. The method of claim 14, wherein a successfully serviced telephone call is a telephone call in which an agent sells a product to the party that placed the telephone call.

16. The method of claim 14, wherein a successfully serviced telephone call is a telephone call in which an agent provides a service to the party that placed the telephone call.

17. The method of claim 14, further comprising, prior to said maintaining:
   identifying a set of characteristics of agents that have successfully serviced a telephone call; and
   with the set of characteristics, defining said multiple pools.

18. The method of claim 14, wherein said maintaining comprises:
   identifying a first agent characteristic;
   identifying multiple agents having said first characteristic; and
   defining said first pool to include the multiple agents.

19. The method of claim 14, wherein said maintaining comprises:
   dynamically updating agent membership in a pool as agents' performance ratings vary.

20. The method of claim 14, wherein said maintaining comprises:
   dynamically updating agent membership in a pool as characteristics of the agents are determined.

21. The method of claim 14, wherein said captured measurements include one or more of:
   length of time an agent was connected to a telephone call, value of a sale made by an agent during a telephone call, number of products sold during a telephone call.

22. The method of claim 14, wherein said automatically selecting a first pool comprises:
   identifying a plurality of pools associated with the destination telephone number; and
   selecting said first pool from the plurality of pools based on weights assigned to each pool in the plurality of pools.

23. The method of claim 14, wherein said automatically selecting a first pool comprises:
   identifying a first characteristic that is believed to correlate to successfully handled telephone calls; and
   selecting said first pool because it is associated with said first characteristic.

24. The method of claim 14, wherein said automatically selecting a best available agent comprises:
   if no agent is available in said first pool, selecting a second pool;
   wherein a hierarchy of pools is available for searching for the best available agent.

25. A non-transitory computer readable medium storing instructions that, when executed by a computer, cause the computer to perform a method of routing a telephone call to an agent best qualified to handle the call, comprising:
- maintaining multiple pools of agents for servicing telephone calls, wherein each said pool is associated with one or more unique characteristics;
- ranking the agents in the plurality of pools including:
  - assigning a new agent to a group of agents from the plurality of pools, said group including lower performing agents;
  - reserving a specified percentage of calls to be routed to said group;
  - distributing the specified percentage of calls to be routed to said group among agents in said group using an equal distribution scheme; and
  - ranking the new agent based on the new agent's success in handling calls routed to the new agent;
- automatically capturing measurements of success of multiple telephone calls successfully serviced by agents in different pools;
- receiving a first telephone call at a first destination telephone number;
- automatically selecting a first pool in the multiple pools;
- automatically selecting the best available ranked agent in the selected pool, wherein the best available ranked agent is defined as an available agent more successful at handling calls than all other available ranked agents in the selected pool; and
- automatically connecting the first telephone call to the best available ranked agent.

26. A computer-implemented method of automatically routing calls in a telephone servicing system, the method comprising:
- establishing a campaign to sell a product to parties who call one of a set of telephone numbers associated with the campaign;
- defining a plurality of pools of agents for servicing telephone calls to the telephone numbers, said defining comprises:
  - selecting a personal characteristic;
  - assigning one or more agents having the personal characteristic to a pool associated with the personal characteristic; and
- ranking the one or more agents based on their past success in selling products, including:
  - assigning a new agent to a group of agents from the plurality of pools, said group including lower performing agents;
  - reserving a specified percentage of calls to be routed to said group;
  - distributing the specified percentage of calls to be routed to said group among agents in said group using an equal distribution scheme; and
  - ranking the new agent based on the new agent's success in handling calls routed to the new agent;
- receiving a first call at one of the telephone numbers;
- automatically selecting a pool, from the plurality of pools, to service the first call; and
- automatically routing the first call to the highest ranking agent in the selected pool.

27. The method of claim 26, wherein a personal characteristic associated with a first pool in the plurality of pools is one of: age, sex, marital status, number of children, household size, language, ethnicity, education, geographical location, hobby and skill.

28. The method of claim 26, further comprising:
- automatically maintaining the plurality of pools, wherein said maintaining comprises one or more of:
  - adding a new agent to a first pool; and
  - removing an existing agent from a second pool.

29. A non-transitory computer readable medium storing instructions that, when executed by a computer, cause the computer to perform a method of automatically routing calls in a telephone servicing system, the method comprising:
- establishing a campaign to sell a product to parties who call one of a set of telephone numbers associated with the campaign;
- defining a plurality of pools of agents for servicing telephone calls to the telephone numbers, said defining comprises:
  - selecting a personal characteristic;
  - assigning one or more agents having the personal characteristic to a pool associated with the personal characteristic; and
- ranking the one or more agents based on their past success in selling products, including:
  - assigning a new agent to a group of agents from the plurality of pools, said group including lower performing agents;
  - reserving a specified percentage of calls to be routed to said group;
  - distributing the specified percentage of calls to be routed to said group among agents in said group using an equal distribution scheme; and
  - ranking the new agent based on the new agent's success in handling calls routed to the new agent;
- receiving a first call at one of the telephone numbers;
- automatically selecting a pool, from the plurality of pools, to service the first call; and
- automatically routing the first call to the highest ranking agent in the selected pool.

30. A computer-implemented method of automatically routing a telephone call to an agent, comprising:
- identifying a campaign involving servicing of telephone calls;
- creating a plurality of pools of agents for servicing the telephone calls, wherein each said pool has one or more associated characteristics common to each agent assigned to said pool;
- ranking the agents in the plurality of pools including:
  - assigning a new agent to a group of agents from the plurality of pools, said group including lower performing agents;
  - reserving a specified percentage of calls to be routed to said group;
  - distributing the specified percentage of calls to be routed to said group among agents in said group using an equal distribution scheme; and
  - ranking the new agent based on the new agent's success in handling calls routed to the new agent;
- receiving a plurality of telephone calls directed to a destination telephone number associated with the campaign, wherein only a limited number of ranked agents is available to handle the telephone calls;
- identifying a first pool having an associated characteristic expected to correlate with successful servicing of telephone calls for the campaign, said first pool including one or more of said limited number of ranked agents;
- for a first available ranked agent in said first pool, identifying a call in the plurality of telephone calls that has characteristics that most closely match the first available ranked agent; and routing the identified call to the first available ranked agent in said first pool.

31. The method of claim 30, wherein said limited number is one.

32. The method of claim 30, wherein:
said characteristics include a first personal characteristic of the first available agent and the caller of the identified call; and
said first personal characteristic is one of: age, sex, marital status, number of children, language, ethnicity, education, geographical location, hobby and skill.

33. The method of claim 30, wherein said characteristics include one or more of: a product associated with the campaign, a service associated with the campaign and a geographical source of the identified call.

34. The method of claim 1, wherein the characteristic includes a first performance characteristic that is one of: conversion rate, gross revenue, order rate and order rate ranking.

* * * * *